Oct. 4, 1949.  L. S. WILLIAMS  2,483,989
PRINTING SCALE
Filed March 23, 1946  5 Sheets-Sheet 1
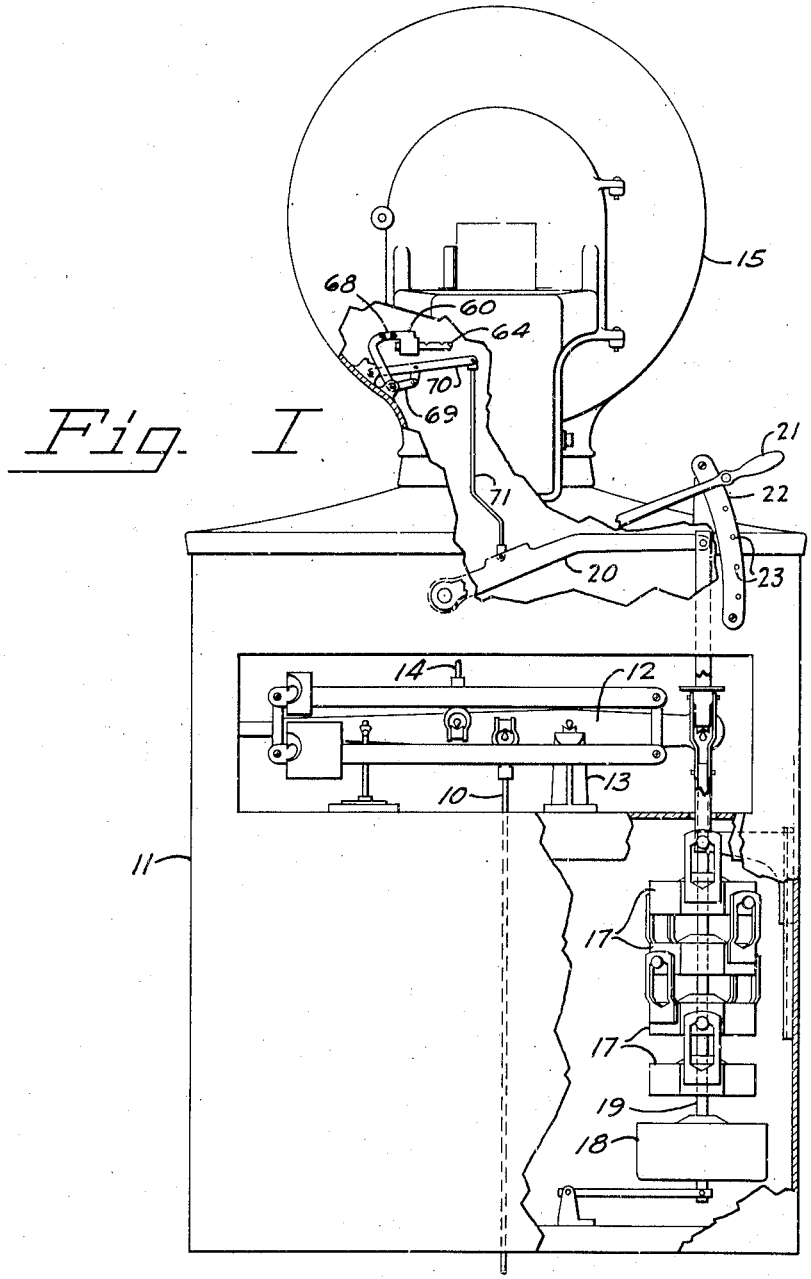
Fig. I
INVENTOR
Lawrence S. Williams
BY
Marshall and Marshall
ATTORNEYS

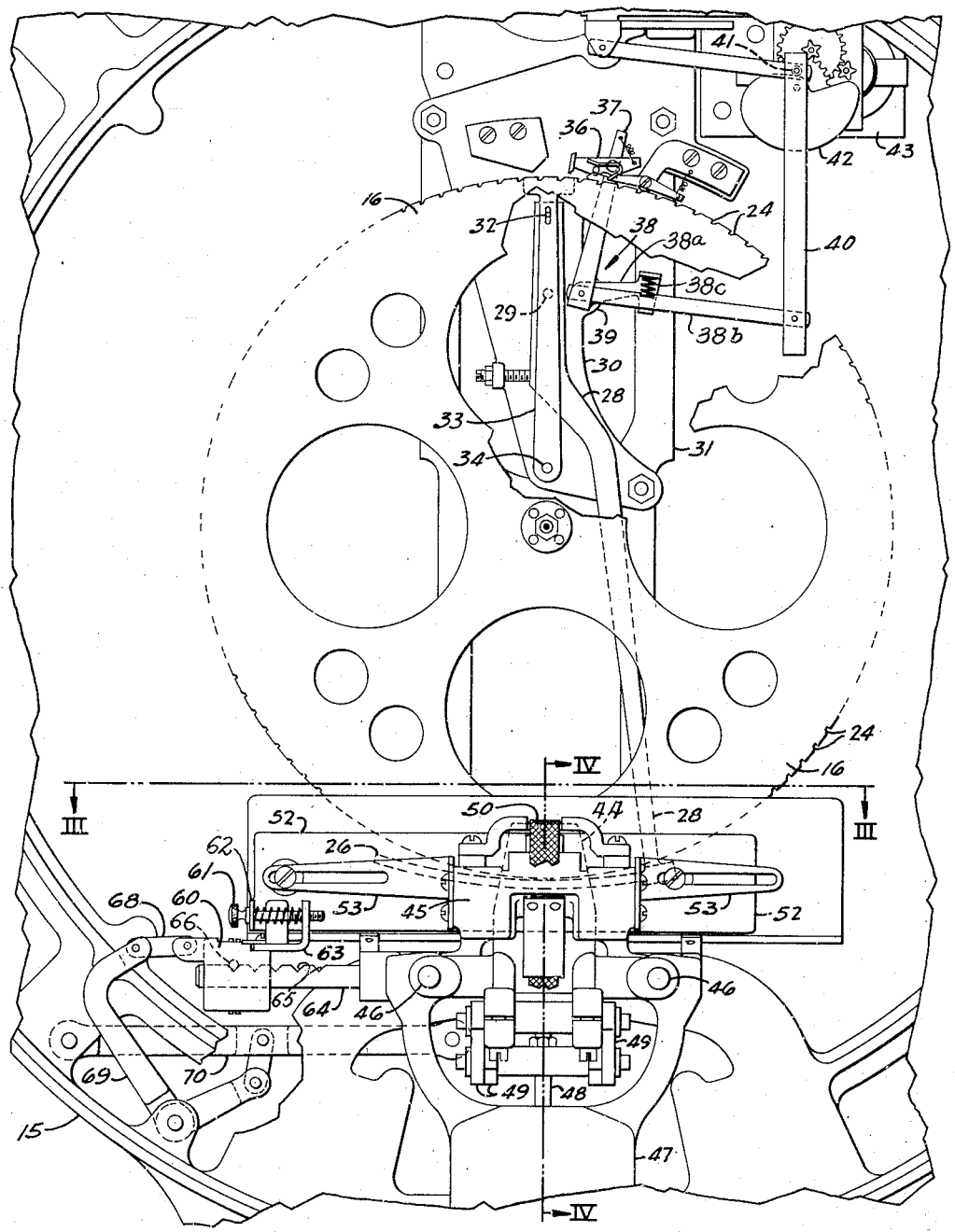

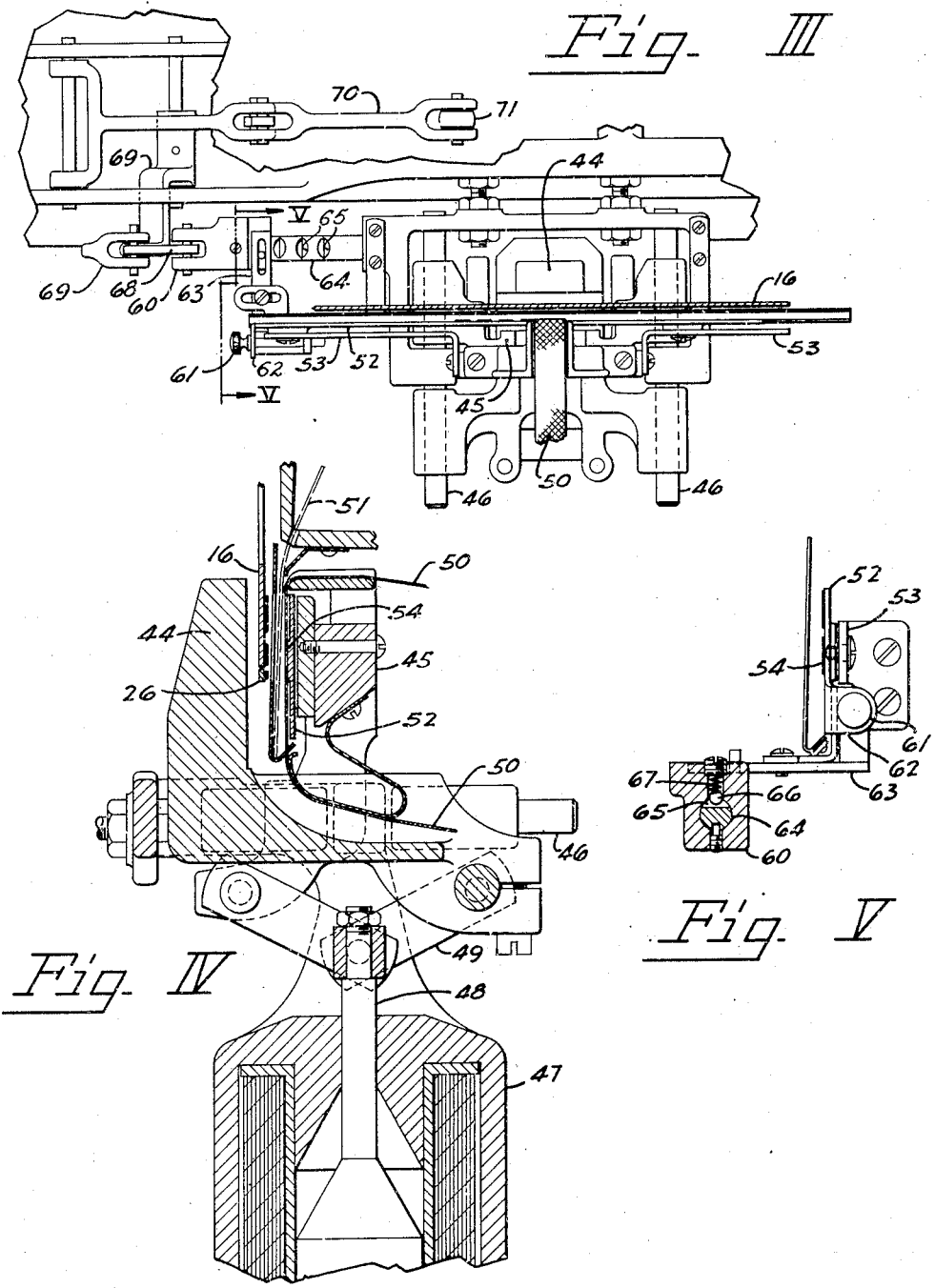

Oct. 4, 1949.  L. S. WILLIAMS  2,483,989
PRINTING SCALE
Filed March 23, 1946  5 Sheets-Sheet 4
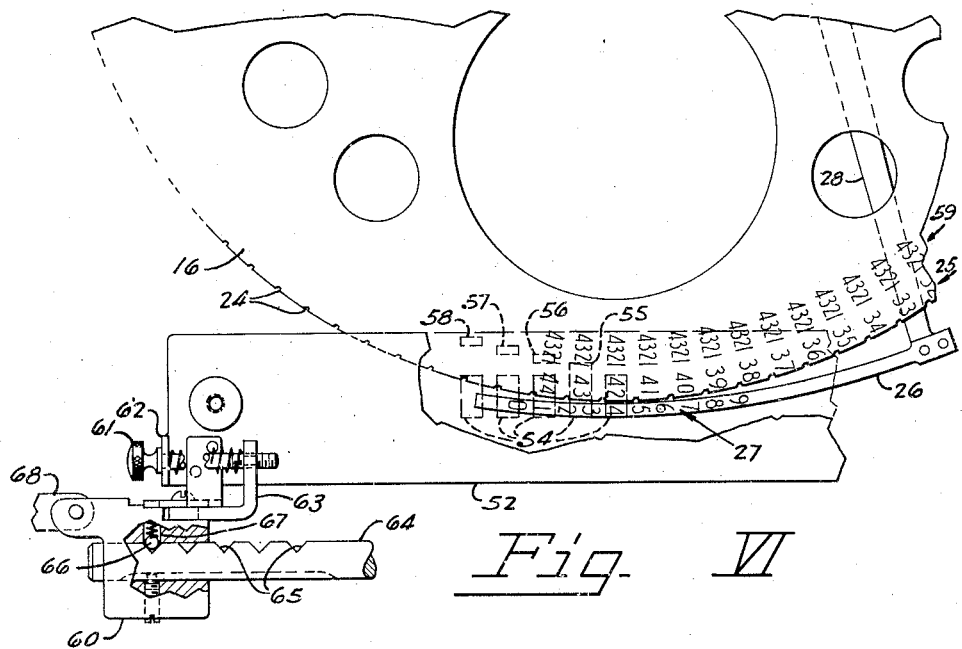
Fig. VI
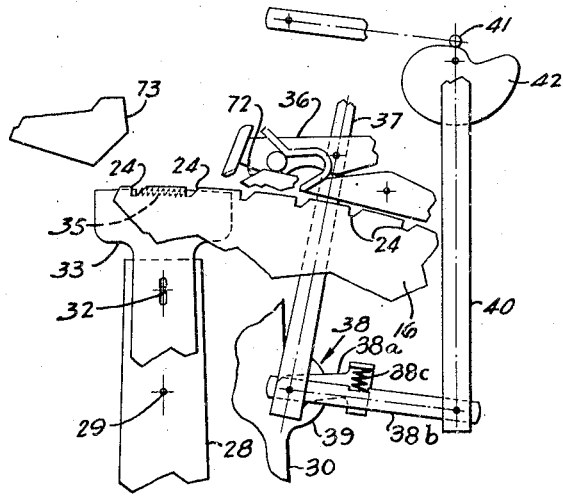
Fig. VII
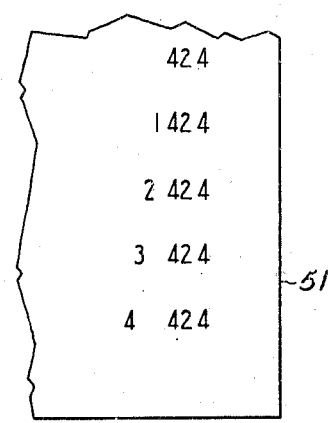
Fig. VIII
INVENTOR
Lawrence S. Williams
BY
Marshall and Marshall
ATTORNEYS Oct. 4, 1949.   L. S. WILLIAMS   2,483,989
PRINTING SCALE
Filed March 23, 1946                    5 Sheets-Sheet 5

INVENTOR
Lawrence S. Williams
BY
Marshall and Marshall
ATTORNEYS

Patented Oct. 4, 1949

2,483,989

UNITED STATES PATENT OFFICE 2,483,989

PRINTING SCALE

Lawrence S. Williams, Toledo, Ohio, assignor to Toledo Scale Company, Toledo, Ohio, a corporation of New Jersey Application March 23, 1946, Serial No. 656,761

6 Claims. (Cl. 265—5)

This invention relates to printing scales of the type employing a printing type bearing member which is responsive to operation of the automatic load counterbalancing mechanism and is particularly concerned with such a printing scale when equipped with added capacity "unit weights" providing therefor a mechanism to print the additional weight being counterbalanced by the scale when the "unit weights" are operative.

It is an object of this invention to provide a printing scale capable of printing the weight of a load being weighed thereon in large clear figures when such weight is counterbalanced by the automatic load counterbalancing mechanism of the scale or by the combination of the automatic mechanism and auxiliary load counterbalancing mechanism.

It is a further object of this invention to provide a mechanism for incorporation in a printing scale to permit the printing of the amounts of the load being counterbalanced by auxiliary load counterbalancing mechanism in line with the amounts being counterbalanced by automatic load counterbalancing mechanism.

More specific objects and advantages are apparent from the description, in which reference is had to the accompanying drawings illustrating a preferred form of scale embodying the invention.

In the drawings:

Figure I is a rear elevational view of a weighing scale embodying the invention, parts of the housing being broken away.

Figure II is a greatly enlarged fragmentary view of printing mechanism embodying the invention.

Figure III is a fragmentary view, taken substantially from the position indicated by the line III—III of Figure II.

Figure IV is a fragmentary vertical sectional view, taken substantially on the line IV—IV of Figure II.

Figure V is a further enlarged view, taken from the position indicated by the line V—V of Figure III.

Figure VI is a still further enlarged fragmentary view of part of the mechanism shown in Figure II.

Figure VII is a fragmentary, somewhat diagrammatic view of selecting mechanism shown in Figure II.

Figure VIII is a fragmentary portion of a printed weight ticket showing the printed indications of weight afforded by the present invention.

Figure IX is a fragmentary view showing various portions of the weight indicia-bearing members.

Figure X is a fragmentary view showing details of the weight printing type and associated platens.

Figure XI is a view similar to Figure X but of a different portion of the series of weight indicating type.

Figure XII is a view similar to Figure IX but of weight indicia-bearing members having indicia arranged thereon for a different series of values.

Figure XIII is a view similar to Figure X but of the printing type shown in Figure XII.

Figure XIV is a view similar to Figure XI but of the printing type shown in Figure XII.

These specific drawings and the specific description that follows merely disclose and illustrate the invention and are not intended to impose limitations upon the claims.

A load receiving platform and lever system (not shown) are connected to a vertical pull rod 10 which extends upwardly into the interior of a cabinet 11. The upper end of the pull rod 10 is pivotally connected to a tare beam 12, which is pivoted upon a fulcrum stand 13 mounted within the cabinet 11. A second pull rod 14 is pivotally connected at its lower end to the beam 12 and extends upwardly into the interior of a dial housing 15 which is mounted atop the cabinet 11 where the pull rod 14 is connected to automatic load counterbalancing mechanism enclosed within the housing 15.

The automatic load counterbalancing mechanism of the scale is operatively connected to a disk 16 which is rotated in a counterclockwise direction (Figure II) by an increase in load placed upon the load receiver. The disk 16 is swung through a distance proportional to the load placed upon the load receiver, being moved by the response of the load counterbalancing mechanism to such load.

Auxiliary load counterbalancing mechanism is also provided in the weighing scale. This comprises a plurality of individual unit weights 17 (Figure I) which may be successively and individually dropped on a jug weight 18 secured to the lower end of a rod 19, the other end of which is pivotally connected to the tare beam 12 on the opposite side of the fulcrum point of the tare beam 12 from the connections between the pull rods 10 and 14 and the tare beam 12. The unit weights 17 are each capable of counterbalancing a predetermined load (in the embodiment shown this load is 1000 pounds per individual unit weight). The unit weights are deposited on the jug weight 18 by means of a lever 20 which is fulcrumed in the cabinet 11 and from the end of which the unit weights are dependingly supported. A hand lever 21, mounted on the exterior of the cabinet 11, is provided to swing the lever 20 and lower the unit weights 17 onto the jug weight 18. The lever 21 slides over an arcuate stop member 22 which is provided with positioning points 23 to correctly locate the hand lever 21 with one, two, three or four of the unit weights 17 resting on the jug weight 18.

As each of the individual unit weights is lowered it increases the load counterbalancing capacity of the scale by a fixed amount, in this case 1000 pounds per unit weight which increased capacity must be overcome before the automatic load counterbalancing mechanism is called into play. Thus whether any of the unit weights are operative, or whether one or more of the weights are in load counterbalancing position, the automatic load counterbalancing mechanism of the scale always counterbalances a number of pounds between "0" and "1000."

The printing disk 16 has a plurality of notches 24, cut in its periphery and a series of printing type 25 (Figure VI) corresponding to such notches. The series of printing type 25 represents tens and hundreds increments of weight. Associated with the printing disk 16 is an arcuate type-bearing member 26 which bears a series of type 27, representing units increments of weight. The arcuate type-bearing member 26 is movable in the same plane as the plane of rotation of the type disk 16 and is located adjacent the periphery of the type disk 16. The arcuate type-bearing member 26 is riveted on the lower end of an arm 28 which is pivoted, as at 29, on a plate 30 bolted to a frame 31 located within the dial housing 15. The upper end of the arm 28 is pivotally connected by a pin 32 (see also Figure VII) to the upper end of a ratchet lever 33 which is pivoted, as at 34, on the plate 30. The upper end of the lever 33 is located in a plane just back of, and parallel to, the plane of rotation of the type disk 16 and carries a series of teeth 35 which extend circumferentially, (with respect to the type disk 16) a distance equal to the distance between any adjacent pair of the notches 24 in the periphery of the type disk 16.

A selecting pawl 36 is mounted on an arm 37 which is a portion of a two-part bell crank 38 pivoted in an ear 39 of the plate 30. The bell crank 38 comprises the arm 37, a short arm 38a integral therewith and a longer arm 38b which is pivoted concentrically with the arms 37 and 38a, and resiliently connected to the arm 38a by a spring 38c. The arm 38b is connected by means of a link 40 to a roller 41 which rides on the periphery of an operating cam 42 rotated by a motor 43 mounted in the upper part of the dial housing 15. The selecting pawl 36 is located just above the edge of the type disk 16.

The type disk 16 extends downwardly between an abutment 44 (Figure IV) and a platen 45 which are slidable on a pair of horizontal rods 46 secured to the frame of the scale, and movable toward each other by the action of a printing solenoid 47 which, when energized, moves its core rod 48 upwardly and, through links 49, squeezes the platen and abutment together. An inked ribbon 50 passes over the face of the platen 45 to register impressions of the type borne by the type disk 16 and arcuate member 26 on a ticket 51 which may be inserted between the ribbon 50 and the type-bearing disk 16 and arcuate member 26.

A transversely slidable platen face 52 (Figures II, III, IV, V and VI) extends horizontally through the space between the abutment 44 and the platen 45 in back of the ribbon 50 which passes over the platen face 52. The platen face 52 is horizontally slidable in a pair of slotted arms 53 which are bolted to the sides of the platen 45. The platen face 52 has five rectangular plateaus 54 (Figure VI) on its inner face which are each of an area equal to the area occupied by one indicium in the series of indicia 25 and one indicium in the series of indicia 27. The face of the platen face 52 also has four smaller plateaus 55, 56, 57 and 58, each one of which is located above a respective one of the plateaus 54. The four smaller plateaus 55, 56, 57 and 58 are spaced a successively further distance from the upper edge of the plateaus 54 with which they are associated (except the plateau 55 which may be a continuation of the adjacent plateau 54) and are each of an area equal to the area occupied by one of the type numerals 1, 2, 3 or 4 in any one set of such type included in a series of such sets of type 59 which is located on the type disk 16 inside the series of indicia 25. The printing indicia 25 are successive since they represent increased loads to be weighed on the scale, but all the sets of numerals in the series 59 are the same since they represent the weights which are counterbalanced by one, two, three or four of the unit weights 17.

One end of the platen face 52 is connected to a slide 60 by means of a bolt 61 which passes through an ear 62 of the platen face 52 and is threaded through an arm 63 bolted to the slide 60. The head of the bolt 61 is knurled to permit adjustment of the platen face 52 relative to the slide 60. The slide 60 is movable on a rod 64 which extends horizontally from the main frame which supports the slide rods 46 and solenoid 47. Five notches 65 are cut in the rod 64 and are engageable by a spring-held ball 66 located in a vertical bore 67 in the slide 60. The five notches 65 correspond to the five plateaus 54 on the face of the platen face 52.

The slide 60, and the platen face 52, are moved horizontally by means of a link 68 (Figures I, II, III and VI) which is connected to a bell crank 69 pivoted on the interior of the dial housing 15 which is in turn linked to a lever 70 connected by a pull rod 71 to the unit weight lifting lever 20.

The inked ribbon 50, behind which the platen face 52 is movable, is only slightly wider than the horizontal width of one of the plateaus 54.

If a load of insufficient weight to require the use of the auxiliary load counterbalancing mechanism is weighed on the scale, the unit weight lever 20 is in the uppermost position shown in Figure I and none of the unit weights 17 are resting on the jug weight 18. With the unit weight lever up, the slide 60 and the platen face 52 are at the limit of their movement to the left (Figures I, II, III and VI) and the first one (extreme right) of the plateaus 54 is located in back of the ribbon 50. The load on the scale, through the medium of the automatic load counterbalancing mechanism, rotates the type disk 16 until that one of the notches 24 in the periphery of the type disk 16 which corresponds to the hundreds and tens increment of weight of the load is positioned to the left of the selecting pawl 36. The exact position of the notch corresponding to the hundreds and tens increments of the load is, of course, determined by the amount of load above the value represented by the particular notch. The position of the particular one of the notches 24 with respect to the teeth 35 in the upper end of the ratchet lever 33 is also determined by the units increment of load. When it is desired to print the weight of the load on the scale the motor 43 is energized which rotates the cam 42 in a clockwise direction pulling upwardly on the link 40 and swinging the bell crank 38 in a counterclockwise direction. This slides the selecting pawl 36 down an inclined member 72 (Figure VII) on which the pawl 36 rests and into engagement with the periphery of the type disk 16. The edge of the pawl 36 slides along the type disk until it enters that one of the notches 24 corresponding to the hundreds and tens value of the load which is in line with that one of the teeth 35 corresponding to the units value of the load. The edge of the pawl 36 then enters that particular one of the teeth 35 and continues with the type disk 16 to move to the left in Figure VII until it jams against a stop 73 at which time the type disk 16 has been rotated in a counterclockwise direction a sufficient distance to move the proper indicium in the series 25 into position to be squeezed by the first of the plateaus 54. Also the ratchet lever 33 has been swung far enough to move the arm 28 and the arcuate type-bearing member 26 to line up that indicium in the series 27 which corresponds to the units increment of the weight of the load, with the first of the plateaus 54. The solenoid 47 is then energized and the type disk 16 and the arcuate member 26 squeezed against the ticket 51 and ribbon 50 to print an indication of the weight as shown by the numerals "424" in Figure VIII.

If the weight of the load on the scale is sufficient to require the use of one of the unit weights 17, the hand lever 21 is moved downwardly until it is engaged in the first of the positioning points 23 in the arcuate member 22 which, through the linkage connecting the unit weight lever 20 to the slide 60, moves the slide 60 until the ball 66 is engaged in the second one of the notches 65 in the rod 64. This locates the second one of the plateaus 54 and the single numeral plateau 55 back of the ribbon 50 in printing position and, therefore, when the abutment 44 and platen 45 are squeezed together the platen 55 will print "1" and the second one of the plateaus 54 will print "424" as shown by the numerals "1424" in Figure VIII.

Similarly, if the weight of the load on the scale were 2424 pounds, 3424 pounds or 4424 pounds, and either two, three or four of the unit weights 17 were lowered on the jug weight 18, the slide 60 would be located in the third, fourth, or fifth one of the notches 65 and the third, fourth or fifth ones of the plateaus 54 and their associated plateaus 56, 57 or 58 respectively would be positioned behind the ribbon 50 to print the weights as shown by the numerals "2 424," "3 424," "4 244" in Figure VIII.

The figures comprising the series of printing type 25 and the series of sets of type 59 must be varied when the maximum capacity of the scale is varied and also when the smallest increment of weight is varied. For example, in Figure IX there is shown the type which would be employed on the member 26 and the disk 16 for a weighing scale having an automatic counterbalancing capacity of 500 pounds by increments of 0.5 pound and additional load counterbalancing capacity in increments of 500 pounds. The series of type 25 (the first two figures on the right side of the disk 16 as shown in Figure IX) prints the tens and hundreds digits of any printed weight figure. The sets of type 59 for a scale of this capacity consists of the numerals "2," "1," "1" and, in the fourth position, "5," "6," "7," "8," "9" or "10."

Figure X illustrates the relative positions of the type and the plateaus 54 and 55, 56, 57, and 58. In this figure there is diagrammatically shown the type and plateaus which would cooperate to print a weight indication for the values of 100 pounds, 600 pounds, 1100 pounds, 1600 pounds and 2100 pounds, reading in that order from top to bottom in Figure X.

Figure XI illustrates the relative cooperation of the plateaus and type at "full capacity" positions of the indicia-bearing disk 16 and shows the cooperation between the plateaus and type at loads of 500 pounds, 1000 pounds, 1500 pounds, 2000 pounds and 2500 pounds. Inasmuch as the total weight, at full capacity of the automatic load counterbalancing mechanism plus one 500 pound increment of the additional load counterbalancing mechanism, is 1000 pounds, a "10" must be printed by the plateau 55 whereas a single digit figure is printed by that plateau at all other values between 501 and 999. The plateaus 55, 56, 57 and 58 must, therefore, be of such size and so positioned that they do not overlap and the "hundreds" figures in the type series 59 must include a "10" as a "digit," i. e., the "10" cannot be printed by the "1" used to print "1500" and the "0" by the type used in printing, for example "2000."

A similar problem is encountered in scales having other maximum automatic load counterbalancing capacities and minor increments of weight. For example, in Figures XII, XIII and XIV, the figures and plateaus illustrated are arranged for a scale having an automatic load counterbalancing capacity of 1000 pounds by 1 pound with "unit weights" each having a load counterbalancing capacity of 1000 pounds. As can be seen in Figure XII the numerals comprising the set of type in the series 59 which are employed at "full capacity" must consist of five digits "1," "2," "3," "4," and "5," which must be spaced as shown in Figures XIII and XIV so that indication can properly be afforded at positions such as that shown in Figure XIII or at "full capacity" as shown in Figure XIV.

The embodiment of the invention that has been disclosed may be modified to meet various requirements.

Having described the invention, I claim:

1. In a weighing scale having automatic load counterbalancing mechanism, manipulative increased capacity load counterbalancing mechanism and an indicia-bearing member responsive to operation of said automatic mechanism, in combination, a series of consecutive indicia on said indicia-bearing member, a series of repetitive increased capacity indicia on said indicia-bearing member, said series of repetitive indicia comprising numerals corresponding to the increased load counterbalanced by said manipulative mechanism, means for exhibiting that one of said consecutive indicia corresponding to the value of a load automatically counterbalanced and a platen strip positionable according to the position of said manipulative mechanism for selecting certain of said repetitive indicia for exhibition with said consecutive indicia to directly indicate the total load counterbalanced by both said load counterbalancing mechanisms.

2. In a weighing scale having automatic load counterbalancing mechanism, manipulative increased capacity load counterbalancing mechanism and a printing-indicia-bearing member responsive to operation of said automatic mechanism, in combination, a series of consecutive indicia on said printing-indicia-bearing member representing values of loads capable of being counterbalanced by said automatic mechanism, a series of repetitive indicia on said printing-indicia-bearing member, each indicium in said repetitive series being adjacent one of the indicia in said consecutive series and comprising a set of numerals each of which represents a fixed value of load capable of being counterbalanced by said manipulative mechanism, and means operated by manipulation of said manipulative mechanism to cause that one of such numerals representing the value of the portion of the total load on said scale which is counterbalanced by said manipulative mechanism to be printed adjacent that indicium in said consecutive series of indicia representing that portion of the total load on said scale which is counterbalanced by said automatic mechanism.

3. In a weighing scale having automatic load counter-balancing mechanism, manipulative increased capacity load counterbalancing mechanism and a printing-indicia-bearing member responsive to operation of said automatic load mechanism, in combination, a series of consecutive indicia on said indicia-bearing member corresponding to the values of portions of loads counterbalanced by said automatic mechanism, a group of numerals each representing a value of a load counterbalanced by said manipulative mechanism, means for printing that indicium in said series of consecutive indicia corresponding to that portion of a load counterbalanced by said automatic mechanism, said numerals being so located as to be printed adjacent to such indicium and means operatively connected to said manipulative mechanism for selectively causing the printing of that one of said numerals corresponding to that portion of a load counterbalanced by said manipulative mechanism.

4. Printing mechanism for a weighing scale having automatic load counterbalancing mechanism and an element movable in proportion to the load counterbalanced thereby and manipulative increased capacity load counterbalancing mechanism comprising, in combination, a series of consecutive printing indicia on said element corresponding to values of loads counterbalanced by said automatic mechanism, a plurality of groups of repetitive printing indicia on said element, each of said groups being positioned adjacent one of the indicia in said series of consecutive printing indicia, each of said groups of repetitive printing indicia comprising numerals corresponding to the values of the portions of the load counterbalanced by said manipulative mechanism, and means including a member operatively connected to said manipulative means for selectively printing that one of such numerals corresponding to that portion of the total load being counterbalanced by said manipulative mechanism and that one of said series of consecutive printing indicia corresponding to that portion of the total load being counterbalanced by said automatic mechanism in juxtaposition to indicate the value of the total load being counterbalanced.

5. Printing mechanism for a weighing scale having automatic load counterbalancing mechanism and an element movable in proportion to the load counterbalanced thereby and manipulative increased capacity load counterbalancing mechanism comprising, in combination, a series of consecutive printing indicia on said element corresponding to values of loads counterbalanced by said automatic mechanism, a plurality of groups of repetitive printing indicia on said element, each of said groups being positioned adjacent one of the indicia in said series of consecutive printing indicia, each of said groups of repetitive printing indicia comprising numerals corresponding to the values of the portions of the load counterbalanced by said manipulative mechanism, and a selective printing means comprising a platen having a printing area for printing that one of the indicia in said series of consecutive printing indicia corresponding to that portion of the total load being counterbalanced by said automatic mechanism on each printing operation and selectable printing areas positionable according to the position of said manipulative mechanism for printing that one of the numerals comprising the adjacent one of said groups of repetitive printing indicia corresponding to that portion of the total load being counterbalanced by said manipulative mechanism.

6. Printing mechanism for a weighing scale having automatic load counterbalancing mechanism and an element movable in proportion to the load counterbalanced thereby and manipulative increased capacity load counterbalancing mechanism comprising, in combination, a series of consecutive printing indicia on said element corresponding to values of loads counterbalanced by said automatic mechanism, a plurality of groups of repetitive printing indicia on said element, each of said groups being positioned adjacent one of the indicia in said series of consecutive printing indicia, each of said groups of repetitive printing indicia comprising numerals corresponding to the values of the portions of the load counterbalanced by said manipulative mechanism, a movable printing platen having a printing area in line with the indicia in said series of consecutive printing indicia and a printing area in line with each of the numerals comprising one of said groups of repetitive printing indicia and means operated by said manipulative mechanism for moving into printing position that one of the last mentioned printing areas corresponding to that portion of the load being counterbalanced by said manipulative mechanism.

LAWRENCE S. WILLIAMS.

REFERENCES CITED

The following references are of record in the file of this patent:

UNITED STATES PATENTS

| Number | Name | Date |
|---|---|---|
| 2,291,150 | Dimick et al. | July 28, 1942 |
| 2,331,092 | Hem | Oct. 5, 1943 |
| 2,343,623 | Williams | Mar. 7, 1944 |